United States Patent
Brauchle et al.

(10) Patent No.: US 8,084,714 B2
(45) Date of Patent: Dec. 27, 2011

(54) PROTECTION DEVICE OF A LASER PROCESSING UNIT

(75) Inventors: Thomas Brauchle, Leonberg (DE); Markus Wirnitzer, Well der Stadt (DE); Gunter Fischer, Moensheim (DE); Wolfgang Staiger, Leonberg/Hoeflngen (DE)

(73) Assignee: Trumpf Laser-und Systemtechnik GmbH, Ditzingen (DE)

( * ) Notice: Subject to any disclaimer, the term of this patent is extended or adjusted under 35 U.S.C. 154(b) by 1620 days.

(21) Appl. No.: 11/226,923

(22) Filed: Sep. 13, 2005

(65) Prior Publication Data

US 2006/0076322 A1    Apr. 13, 2006

(30) Foreign Application Priority Data

Sep. 14, 2004  (EP) ..................................... 04021785

(51) Int. Cl.
*B23K 26/12* (2006.01)
(52) U.S. Cl. ............ 219/121.86; 219/121.6; 219/121.85
(58) Field of Classification Search ............. 219/121.86, 219/121.6, 121.85; 451/451
See application file for complete search history.

(56) References Cited

U.S. PATENT DOCUMENTS

| | | | | |
|---|---|---|---|---|
| 2,755,081 A * | 7/1956 | Johnson et al. | ............... | 160/188 |
| 2,936,463 A * | 5/1960 | Tracy | ................................ | 4/607 |
| 4,635,699 A * | 1/1987 | Kauffman et al. | ............ | 160/211 |
| 5,277,240 A * | 1/1994 | Epema et al. | ................ | 160/188 |
| 5,643,477 A * | 7/1997 | Gullo et al. | ............. | 219/121.86 |
| 6,708,956 B1 * | 3/2004 | Mangelsen et al. | ............. | 256/24 |
| 6,749,495 B2 * | 6/2004 | Grund et al. | .................. | 451/451 |
| 6,772,932 B1 * | 8/2004 | Halstead | ........................ | 228/45 |
| 2003/0127440 A1 | 7/2003 | Egashira | | |
| 2003/0183635 A1 * | 10/2003 | Fujii et al. | .................. | 220/345.1 |
| 2005/0120673 A1 * | 6/2005 | Kahl | ............................ | 52/782.1 |

FOREIGN PATENT DOCUMENTS

DE          93 19 380.7          2/1994

* cited by examiner

*Primary Examiner* — M. Alexandra Elve
(74) *Attorney, Agent, or Firm* — Fish & Richardson P.C.

(57) ABSTRACT

A laser processing unit includes a first working area for laser processing of a workpiece, a second working area for laser processing of a workpiece, and a dividing wall adapted to separate the first working area from the second working area between, the dividing wall having individual interconnected sections and being moveable in a vertical direction.

10 Claims, 3 Drawing Sheets

PROTECTION DEVICE OF A LASER PROCESSING UNIT

CLAIM OF PRIORITY

This application claims priority under 35 U.S.C. §119 to European Patent Application Ser. No. 04 02 1785.1, filed on Sep. 14, 2004, the entire contents of which is hereby incorporated by reference.

TECHNICAL FIELD

The disclosure relates to a protection device of a laser processing unit.

BACKGROUND

In laser processing units, rigid, displaceable doors have been used as protection devices and/or for dividing independent working areas. The doors are disposed to be displaceable to permit transfer of an extension arm and/or laser processing head into different working areas. One working area can be designed for preparations, and another working area can be designed for simultaneous laser processing.

SUMMARY

In various aspects, a protection device for a laser processing unit is provided with a simple construction that permits transfer of an extension arm and/or laser processing head between working areas. For example, a protection device of a laser processing unit can have a dividing wall that can be moved in a vertical direction and that consists of individual interconnected sections.

In one implementation, a basic frame is provided that includes a U-shaped guidance for the dividing wall, where the dividing wall can be moved through the basic frame transversely to the longitudinal direction of the basic frame and can be moved out of the basic frame on both longitudinal sides of the basic frame. If, in a central position of the dividing wall, one half of the dividing wall can be moved out of the basic frame on each of the frame's sides, the extension arm and/or the laser processing head can cross the dividing wall.

In an implementation in which the basic frame includes rollers, the dividing wall can be displaced and positioned in the laser processing unit. A drive unit can be provided to move the dividing wall.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
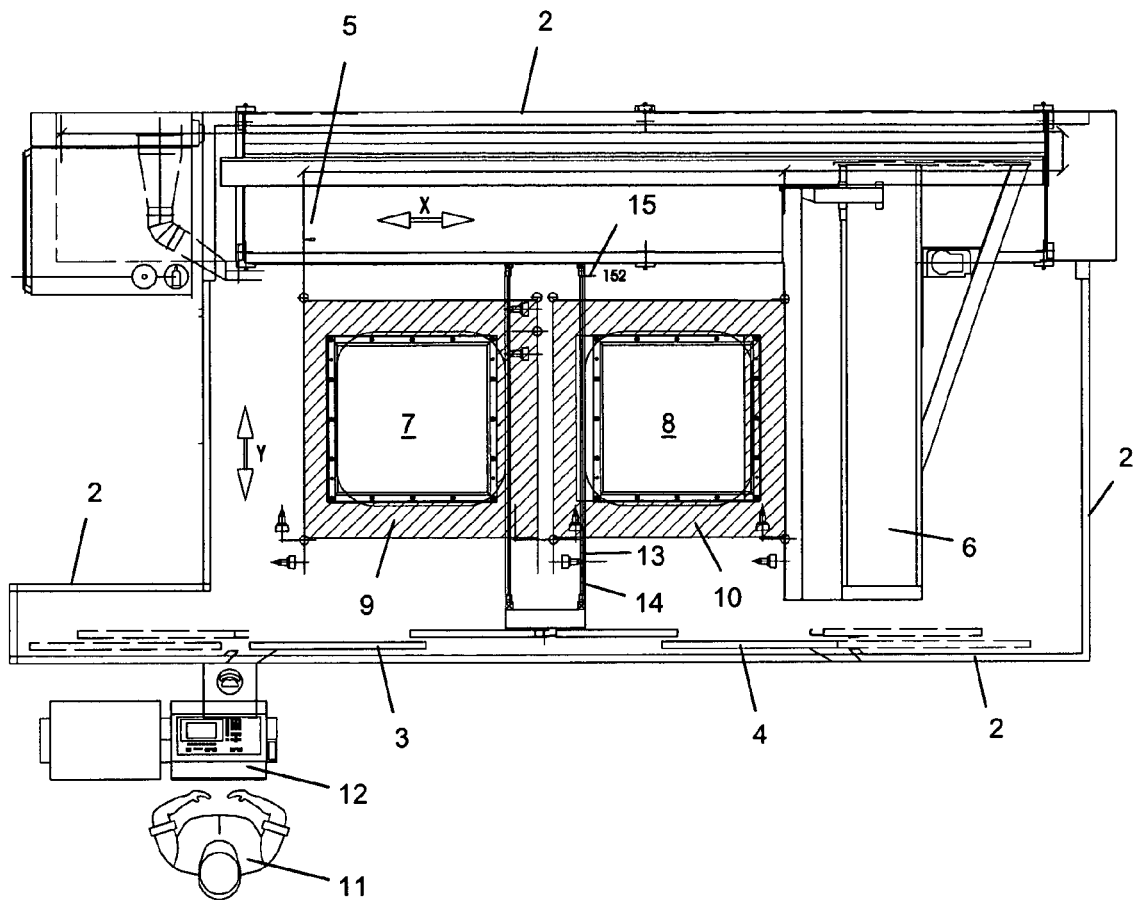
FIG. 1 is a top view of a laser processing unit.

As shown in FIG. 1 a laser processing unit 1 for operation with 2 stations includes outer walls 2 and sliding doors 3 and 4. The laser processing unit 1 is suited for laser processing, such as, for example, laser cutting, laser welding, and hardening. A machine frame 5 supports an extension arm 6 that is provided with a laser processing head (not shown in FIG. 1). By means of the extension arm 6, the laser processing head can be positioned in X, Y, and Z directions above first and second work tables 7 and 8. The independent working areas 9 and 10 that are available for the motion of the laser processing head and that result from the space required for the extension arm 6 and the laser processing head are drawn in hatched lines in FIG. 1.

During operation of the laser processing unit 1, a user 11 can take preparational measures on a work table 7 or 8, can exit the workplace via the sliding door 3 or 4 and can start and perform laser processing from outside the workplace via an operating means 12 while being protected by the closed sliding door 3 or 4. The laser processing unit 1 may also be automated.

Figure 3:
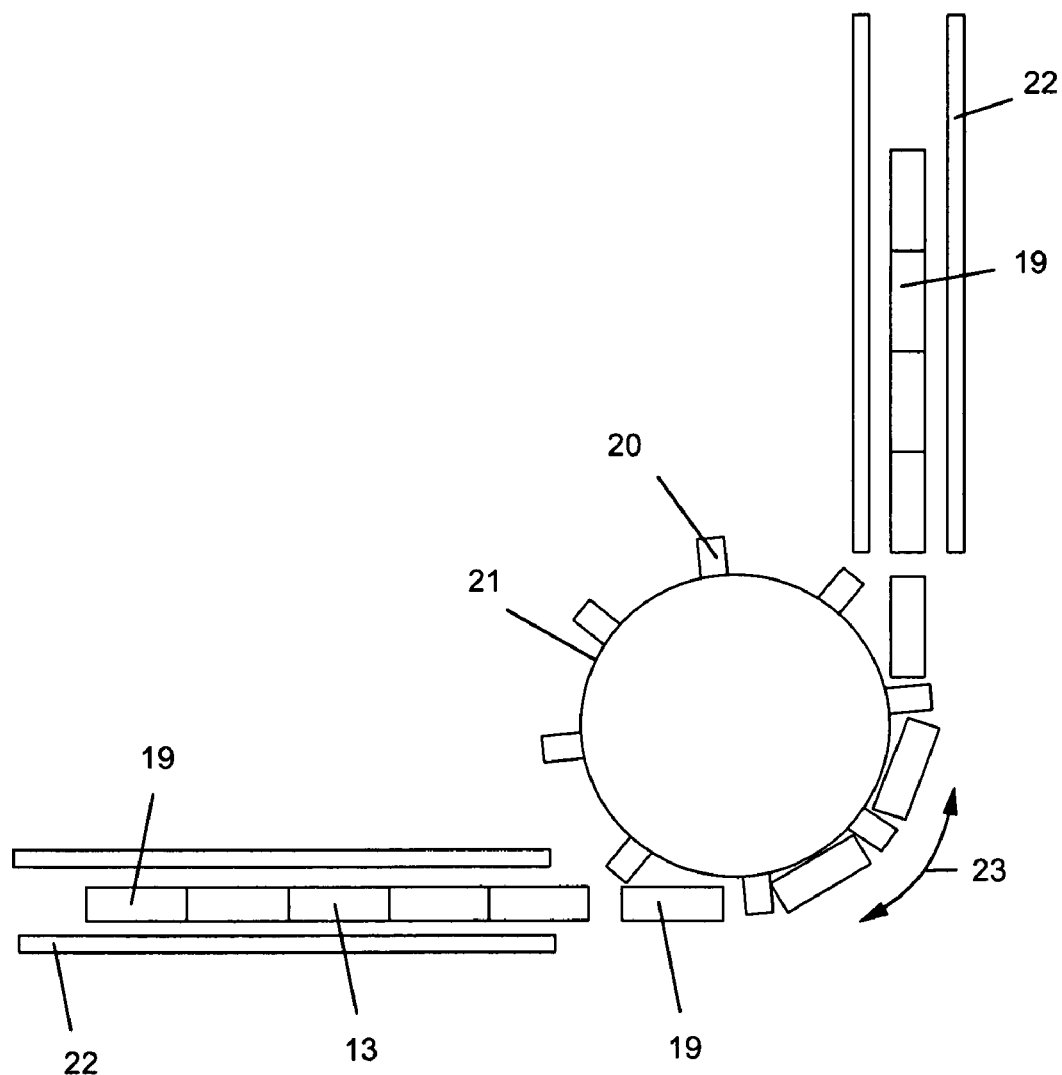
FIG. 3 is an enlarged sectional view of a dividing wall of the protection device.

If a workpiece on a work table 7 or 8 is to be processed, the laser processing head must be transferred from a working area 9 or 10 into the other working area 10 or 9. However, the user 11 can carry out preparations in one working area 9 or 10 only if the working area 9 or 10 is protected from laser radiation. Towards this end, a protection device is provided, which includes a movable dividing wall 13 that includes individual sections (as shown in FIG. 3) of the type of a circulating roller blind. The ends 14 and 15 of the dividing wall 13 can be guided in guiding rails. In this manner, laser processing can be performed in one working area while the other working area can be used for preparations.

Figures 2A, 2B, 2C:
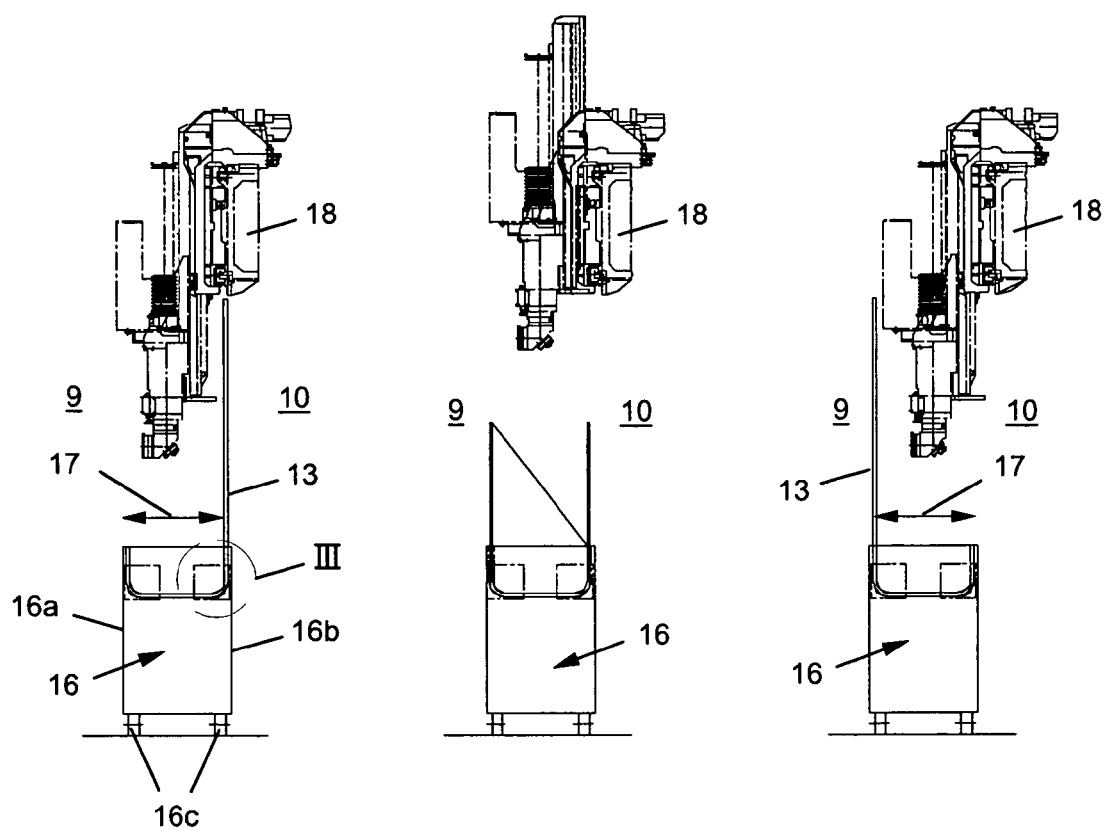
FIGS. 2a, 2b, and 2c are side views of a protection device of the laser processing unit shown in FIG. 1.

FIGS. 2a, 2b, and 2c show, in sequence, different possible motions of the dividing wall 13. In a first position, as shown in FIG. 2a, the dividing wall 13 is completely extended on the side facing the working area 10. The working area 10 is shielded and the user could work there. On the side facing the working area 9, the dividing wall 13 is countersunk into a basic frame 16 with basic frame walls 16a and 16b, such that part 17 of the working area is provided for the motion of the extension arm or the laser processing head 18.

In a second position, as shown in FIG. 2b, the dividing wall 13 is partially extended both on the side facing the working area 9 and on the side facing the working area 10, i.e. by half the length of the wall 13. This permits crossing of the dividing wall 13 by the laser processing head 18. The dividing wall 13 projects past both sides of the basic frame 16.

In a third position, as shown in FIG. 2c, the dividing wall 13 is completely extended on the side facing the working area 9. The working area 9 is shielded and the user could work there. On the side facing the working area 10, the dividing wall 13 is countersunk into the basic frame 16 of the dividing wall 13 such that part 17 of the working area is provided to move the extension arm or the laser processing head 18. The part 17 of the working area is alternately part of the working area 9 or 10 for which it can then be used.

The basic frame 16 has rollers 16c and can be pushed into the working area of the laser processing unit, thereby dividing the working area into two independent working areas. The basic frame 16 and dividing wall 13 can also be removed, if required, to permit use of the entire working area for laser processing of larger workpieces.

As shown in FIG. 3, the dividing wall 13 includes individual articulated sections 19. Connecting pieces of the sections 19 are not shown but are designed such that the sections 19 can be pushed together, similar to blinds, sliding doors, or rolling gates. Teeth 20 of a driving wheel 21 of a drive unit accommodated in the basic frame can engage in gaps of the sections 19 with a geared motor or electromotor and thereby move the dividing wall 13 in along the direction of the double arrow 23 to move the dividing wall up or down in the guiding rail 22.

A number of implementations have been described. Nevertheless, it will be understood that various modifications may be made. Accordingly, other embodiments are within the scope of the following claims.

What is claimed is:

1. A laser processing unit comprising:
   a first working area for laser processing of a workpiece;
   a second working area for laser processing of a workpiece; and
   a dividing wall adapted to separate the first working area from the second working area, the dividing wall having individual articulated and interconnected sections and being moveable in a U-shaped path having a transverse portion that extends generally along an X direction and a pair of vertical portions on either side of the transverse portion that extend generally along a Z direction that is perpendicular to the X direction.

2. The laser processing unit of claim 1, further comprising a frame having a U-shaped guidance for guiding at least a portion of the dividing wall during movement of the dividing wall, the guidance having two walls at either longitudinal side of the frame for guiding at least a portion of the dividing wall in a vertical direction, wherein at least a portion of the dividing wall is adapted for movement across the frame in a longitudinal direction, and wherein at least a portion of the dividing wall is adapted to move out of the frame on both longitudinal sides of the frame.

3. The laser processing unit of claim 2, wherein at least half of the dividing wall is adapted for movement out of the frame on each side in a vertical direction.

4. The laser processing unit of claim 2, wherein the frame includes rollers over which the dividing wall is adapted to move.

5. The laser processing unit of claim 2, wherein the frame includes a drive unit that engages with the dividing wall for moving the dividing wall.

6. A method of laser processing workpieces in a first working area and in a second working area, the method comprising:
   positioning at least a first portion of a dividing wall having individual interconnected sections in a vertical position that extends generally along a Z direction between the first working area and the second working area to prevent laser radiation from a laser processing head in the first working area from entering the second working area;
   processing a workpiece in the first working area with the laser processing head;
   moving the dividing wall in a U-shaped guidance, the guidance having two vertical portions for guiding the dividing wall generally in the Z direction and a transverse portion between the two vertical portions for guiding the dividing wall generally along an X direction perpendicular to the Z direction, until the dividing wall is not positioned prevent laser radiation from a laser processing head in the first working area from entering the second working area;
   moving the laser processing head from the first working area to the second working area; and
   moving the dividing wall in the U-shaped guidance, until the dividing wall is positioned to prevent laser radiation from a laser processing head in the second working area from entering the first working area.

7. The method of claim 6, further comprising moving the dividing wall by driving a toothed rotary wheel that engages with the dividing wall.

8. The method of claim 7, wherein teeth of the rotary wheel engage gaps between the interconnected sections of the dividing wall.

9. The laser processing unit of claim 1, further comprising a third working area above the U-shaped path, wherein the third working area is alternately part of the first working area or the second working area as the dividing wall is moved.

10. The laser processing unit of claim 2, further comprising one or more rollers at the bottom of the frame to enable the frame to be moved into and out of a position between the first and second working areas.

* * * * *

UNITED STATES PATENT AND TRADEMARK OFFICE
CERTIFICATE OF CORRECTION

PATENT NO. : 8,084,714 B2  
APPLICATION NO. : 11/226923  
DATED : December 27, 2011  
INVENTOR(S) : Brauchle et al.

It is certified that error appears in the above-identified patent and that said Letters Patent is hereby corrected as shown below:

On title page, Item (75)

On the first page, column 1 under Inventors, delete "Markus Wirnitzer, Well der Stadt (DE)" and insert --Markus Wirnitzer, Weil der Stadt (DE)--.

On the first page, column 1 under Inventors, delete "Wolfgang Staiger, Leonberg/Hoeflngen (DE)" and insert --Wolfgang Staiger, Leonberg/Hoefingen (DE)--.

In Claim 6, line 17, delete "prevent" and insert --to prevent--.

Signed and Sealed this  
Fifteenth Day of May, 2012

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,084,714 B2 | Page 1 of 1 |
| APPLICATION NO. | : 11/226923 | |
| DATED | : December 27, 2011 | |
| INVENTOR(S) | : Brauchle et al. | |

It is certified that error appears in the above-identified patent and that said Letters Patent is hereby corrected as shown below:

On title page, Item (75)

On the first page, column 1 under Inventors, delete "Markus Wirnitzer, Well der Stadt (DE)" and insert --Markus Wirnitzer, Weil der Stadt (DE)--.

On the first page, column 1 under Inventors, delete "Wolfgang Staiger, Leonberg/Hoeflngen (DE)" and insert --Wolfgang Staiger, Leonberg/Hoefingen (DE)--.

Claim 6, column 4, line 17, delete "prevent" and insert --to prevent--.

This certificate supersedes the Certificate of Correction issued May 15, 2012.

Signed and Sealed this
Nineteenth Day of June, 2012

David J. Kappos
*Director of the United States Patent and Trademark Office*